United States Patent [19]

Schenk et al.

[11] 4,433,379

[45] Feb. 21, 1984

[54] MICROCOMPUTER SYSTEM WITH INPUT/OUTPUT UNIT CONNECTED TO THE REMAINDER OF THE SYSTEM BY A SINGLE MULTIBIT BUS AND SEVERAL SEQUENTIAL DATA LINES

[75] Inventors: Manfred Schenk, Fellbach; Winfried Klötzner, Maulbronn; Edmund Jeenicke, Schwieberdingen, all of Fed. Rep. of Germany

[73] Assignee: Robert Bosch GmbH, Stuttgart, Fed. Rep. of Germany

[21] Appl. No.: 191,376

[22] Filed: Sep. 29, 1980

[30] Foreign Application Priority Data

Oct. 31, 1979 [DE] Fed. Rep. of Germany ....... 2943903

[51] Int. Cl.³ .............................................. G06F 3/00
[52] U.S. Cl. .................................................. 364/200
[58] Field of Search ... 364/200 MS File, 900 MS File

[56] References Cited

U.S. PATENT DOCUMENTS 4,131,940  12/1978  Moyer ................................ 364/200

*Primary Examiner*—Thomas M. Heckler

*Attorney, Agent, or Firm*—Frishauf, Holtz, Goodman & Woodward

[57] ABSTRACT

The destination of commands provided by a microcomputer to an input-output unit over a data bus is provided without an address bus, while a control circuit in the input-output unit is connected with the microcomputer by connections for only three binary signals in one direction, "clear", chip-select and data strobe and one in the other, namely interrupt. The control circuit has a decoder connected to the data bus that sorts out the commands, feeding the outputs through a gate array that are enabled by the chip-select and data strobe signals for timing. Commands for switching, such as beginning and ending counts, and so on are one-byte commands directly transmitted to the appropriate circuits of the input-output. Read and write commands are two-byte commands sequenced by a sequencing and lockout circuit, the circuit selected in first byte being activated to read or write to or from the data bus in the second byte while the decoder is blocked. The direction of transmission of the data bus is controlled over a single connection from the control circuit in accordance with whether a write command is or is not present.

11 Claims, 4 Drawing Figures

MICROCOMPUTER SYSTEM WITH INPUT/OUTPUT UNIT CONNECTED TO THE REMAINDER OF THE SYSTEM BY A SINGLE MULTIBIT BUS AND SEVERAL SEQUENTIAL DATA LINES

This invention concerns a simplified computer system of the kind containing so-called microcomputer and an input-output unit interconnected by a plurality of conductors, especially a computer system suitable for controlling one or more functions of an automobile engine as, for example, fuel injection.

BACKGROUND AND PRIOR ART

Computer systems incorporating a microcomputer and an input-output unit connected together by a large number of conductors are well-known and are described, for example, in German patent publication 2 900 111, U.S. Pat. No. 4,204,256 and U.S. patent application no. 56,960 (filing data July 12, 1979) now U.S. Pat. No. 4,250,858.

The input-output unit serves to supply external information to the computer unit and to make computer commands and information available externally. In order to obtain the most effective utilization of the input-output circuit it is sought to have as few control connections between the computer unit and the input-output unit, while at the same time having available as many as possible different external connections and, also making it possible being able to fit specific input-output circuits to different computer units as simply as possible.

The known systems usually require the following connections between the input-output unit and the computer unit: a data bus (for 8 bit bytes, 8 conductors), an address bus (e.g., 4 conductors) a write command (MWR) connection, a read command (MRD) connection, a strobe or timing connection, a program interrupt connection (usually referred to simply as the "interrupt" connection) and a "clear" command connection for causing the memory of the input-output unit to be cleared. The selection of the particular circuit of the input-output unit by the computer unit is provided through the address bus that reaches or seizes the location to be selected in the input-output unit simultaneously with the transmission of a data byte.

SUMMARY OF THE INVENTION

It is an object of the present invention to simplify a computer system utilizing a microcomputer unit by reducing the number of connections between the computer unit and an input-output unit with which it cooperates.

Briefly, the address bus is omitted and a decoder is provided in the input-output unit that is connected with the data bus/and provides decoded commands at outputs connected with the register and counter portion of the input-output circuit. utilizing a decoder connected to the data bus for both addressing and data does not require that all commands be constituted by two or more bytes received over the data bus. Switching commands for the input-output unit can readily be recognized and transmitted in response to a single byte. A circuit for controlling the direction of transmission on the data bus is made responsive to whether or not a write command from the computer unit is present. It is particularly advantageous for the system to deal with commands that can be subdivided into write, read and switching commands.

The computer system of the invention has the advantage requiring very few connections between the computer unit and the input-output unit. Instead of the multiplicity of address connections, the write command connection, the read command connection and the strobe (synchronization) connection, there are present in accordance with the invention only two basic connections besides the data bus, namely a chip-select (CS) line for identifying and executing one-byte circuit selections and the data strobe (DS) line. For most systems of interest, however, two more connections, the "clear" and interrupt connections, are necessary. By reduction of the number of connections a substantially simpler matching of an input-output circuit to a variety of computer systems is possible while at the same time a larger number of terminals can be provided for external connections. All this is obtained by the principle that both the selection of the location in the input-output circuit to be reached and the data to be transferred are both communicated over the data bus.

Along with the decoder it is useful to provide a first gate circuit array controlled by the strobe signal for timing, and also by the chip-select signals, also buffer stores for all but the last byte of plural byte commands and a sequencing and lockout circuit handling and protecting the passing of multibyte commands from the decoder to the appropriate circuits of the input-output unit, acting through a second gate array.

BRIEF DESCRIPTION OF THE DRAWINGS

The invention is further described by way of illustrative example with reference to the annexed drawings, in which.

Figure 1:
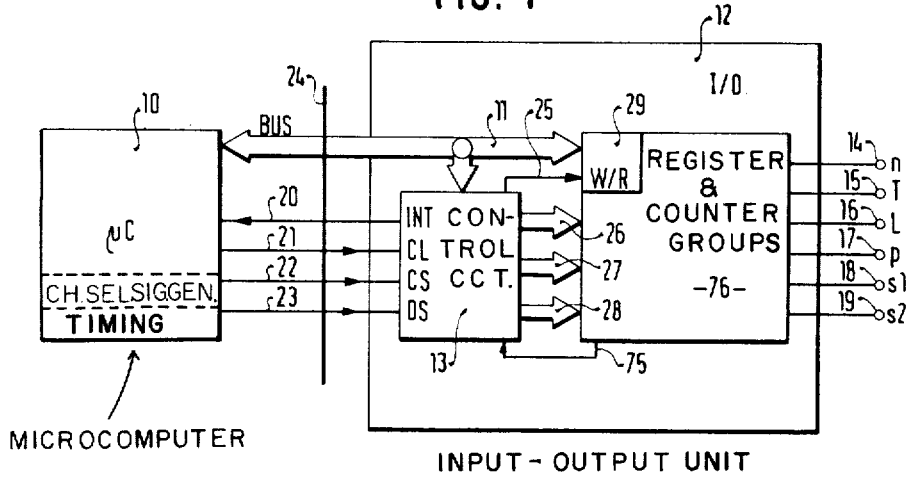
FIG. 1 is a block diagram of a microcomputer unit and an input-output unit connected in a computer system according to the invention.

DESCRIPTION OF THE ILLUSTRATED EMBODIMENT:

FIG. 1 shows a computer unit 10, which is preferably, a microcomputer containing, for example, a microprocessor, at least one random-access working memory (RAM) and at least one fixed value memory, for example, a read-only memory (ROM), connected over a data bus 11 with an input-output unit 12 the connections with the computer going particularly to a control circuit 13 contained in the input-output unit. In the case of an 8bit system (i.e. utilizing 8 bit bytes) the data bus 11 made up of 8 individual lines and serves in a well-known way for transferring information between the individual subassemblies and circuits of the the computer system as well as within the computer unit 10. The input-output unit 12 serves to supply the computer unit 10 with external data and to feed out computer results to external apparatus (not shown).

If such a computer system is installed, for example, in a motor vehicle for control of ignition timing and/or fuel injection and/or transmission ratio control, data such as engine speed n, temperature T, air intake rate L and intake pipe underpressure P are supplied at four terminals 14-17 to the input-output circuit. These supplied operating parameters can naturally be augmented by the provision of still others. Two outputs of the input-output unit are shown at the terminals 18 and 19 that are connected with final control stages $S_1$ and $S_2$ not shown in the drawings. The cooperation of the input-output unit with the computer unit in handling the external data and operating the final control stages, involving particularly the register and counter portion 76 of the input-output unit and the interrupt request line 75, is not further described here, because it is well-known, particularly from the specific references identified above in connection with the discussion of the prior art.

The input-output unit 12 is connected with the computer unit 10 through the control circuit 13 by means of an interrupt connection INT represented by the conductor 20, a "clear" connection CL represented by the conductor 21, a chip-select connection CS represented by the conductor 22 and a data strobe connection DS represented by the conductor 23. An interface 24 is thus provided between the computer unit 10 and the input-output unit 12 equipped with its control circuit 13, this interface consisting of 12 connections (not including ground or reference potential) in the case of an 8 bit data bus.

The control circuit 13 is connected to the register and counter portion 76 of the input-output unit 12 by a write/read control connection W/R represented by the conductor 25, switching command connection 26, by write command connections 27, by read command connection 28 and by an interrupt request connection 75. The write/read control connection 25 goes to a switch-over circuit 29 of the register and counter portion 76 of the input-output circuit for switching over the direction of transmission in the data bus. This switchover circuit 29 is illustrated further in FIG. 2, while the control circuit 13 is shown in more detail in FIG. 3.

Figure 2:
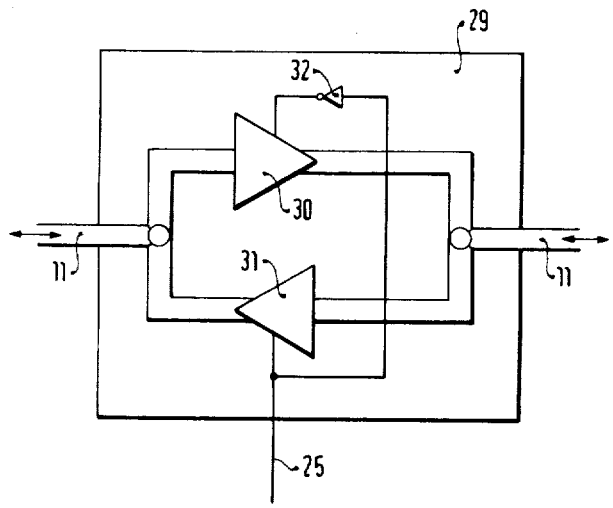
FIG. 2 is a block diagram of the write/read circuit 29 of FIG. 1 for controlling the direction of transmission over the data bus.

As shown in FIG. 2 the switchover circuit 29 consists of two tri-state circuits 30 and 31 in antiparallel connection having their control inputs connected to the write/read connection 25 which is respectively connected directly for the circuit 31 and through an inverter 32 for the circuit 30. In each case the outputs of one tri-state circuits are connected to the inputs of the other so that the junctions represent in each case the two-way connections at either end of the switchover 29. In accordance with whether a 0 or a 1 signal is present on the control line 25, one or the other of the tri-state circuits 30 and 31 is conducting and the remaining one is blocked, so that information can pass only in one direction. Such switchover or reversing circuits are conventionally provided in still other portions of a computer system between component circuits.

Figure 3:
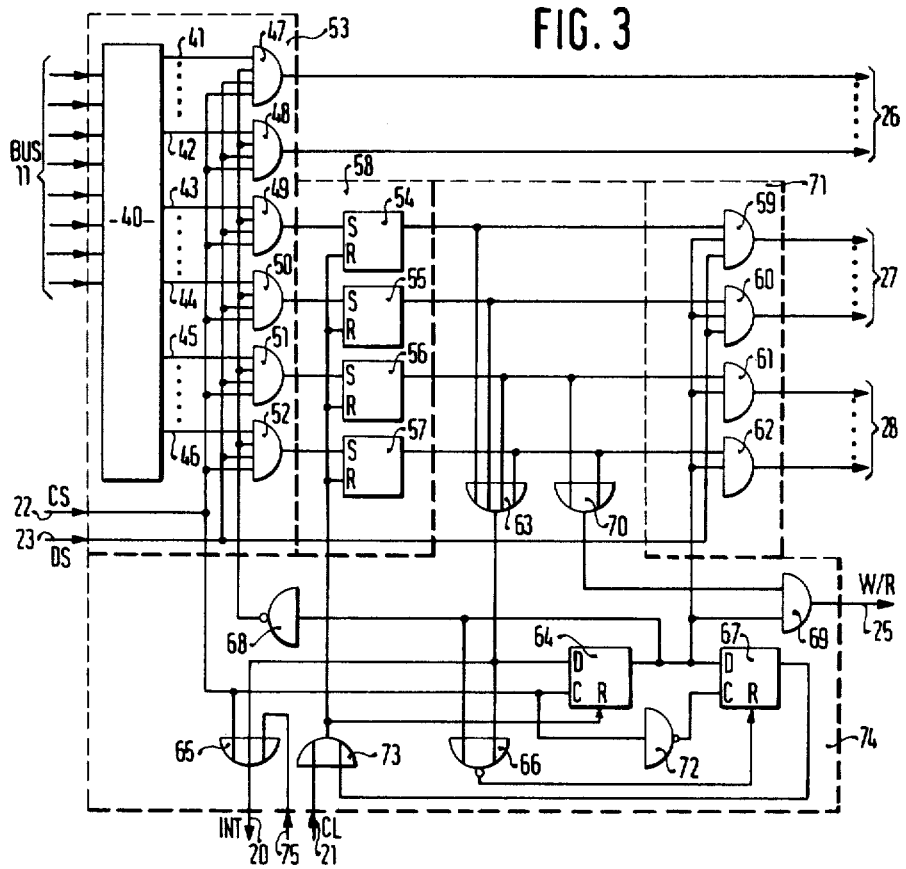
FIG. 3 is a diagram of the control circuit 13 of the input-output circuit of FIG. 1.

In FIG. 3 the 8 conductors of the 8 bit data bus 11 are shown connected with the inputs of a decoder 40, which is itself a well-known circuit for providing a response at a separate output for each of a number of different combinations of binary signals on the inputs. The 6 outputs designated with reference numerals 41-46 are connected with a corresponding number of AND gates 47-52. The lines of dots between the outputs 41 and 42, between the outputs 43 and 44 and between the outputs 45 and 46 are intended to indicate that a larger number of outputs are possible for a correspondingly larger number of possible commands. The highest number of these, in the case of 8 bits is 256 outputs for 256 different commands, which are subdivided into three command groups: switching commands (outputs 41, 42), write commands (outputs 43, 44) and read commands (outputs 45, 46). The number of AND gates 47-52 must naturally correspond to the number of outputs used. For synchronization both the CS line 22 and also the DS line 23 are each connected to one input of each of the AND gates 47-52. The components 40-52 thus constitute a decoding and synchronization circuit 53.

Whereas the outputs of the AND gates 47, 48 connected directly with the switching command lines 26, the outputs of the AND gates 49-52 are connected to the respective set inputs S of four flipflops 54-57, which constitute storage logic 58 for two-byte commands. The outputs of the flipflops 54-57 are respectively connected through AND gates 59-62 with the respective lines of the write line group 27 and the read line group 28. Furthermore, all of the outputs of the flipflops 54-57 are connected through an OR-gate 63 with a D input of a D flipflop 64, then/through another OR-gate 65 with the interrupt line (INT 20) and with an input of a NOR-gate 66.

The output of the D flipflop 64 is connected with the D input of another flipflop 67, with another input of the NOR gate 66, through an inverter 68 with another input of each of the AND gates 47-52, directly with an input of each of the AND gates 59-62, and through an AND gate 69 with the write/read line 25. The outputs of the flipflops 56 and 57 are also connected through an OR gate 70 to another input of the AND gate 69.

The DS line 23 is connected with a further input of each of the AND gates 59 and 60. The four AND gates 59-62 thus constitute a data strobe logic circuit 71. The interrupt request line 75 is connected with an input of the OR gate 65. Finally the CS line 22 is also connected with an additional input of the OR gate 65, with the synchronizing input C of the first D flipflop 64 and through an inverter 72 with the synchronizing input/C of the second D flipflop 67. The output of the NOR gate 66 is connected to the reset input R of the flipflop 67, the output of which is connected through an OR gate 73 with the reset inputs R of the flipflops 54-57 and 64. The second input of the OR gate 73 is connected with the "clear" (CL) line 21. The components 63-70, 72 and 73 thus constitute a sequencing circuit 74 for two-byte command.

Figure 4:
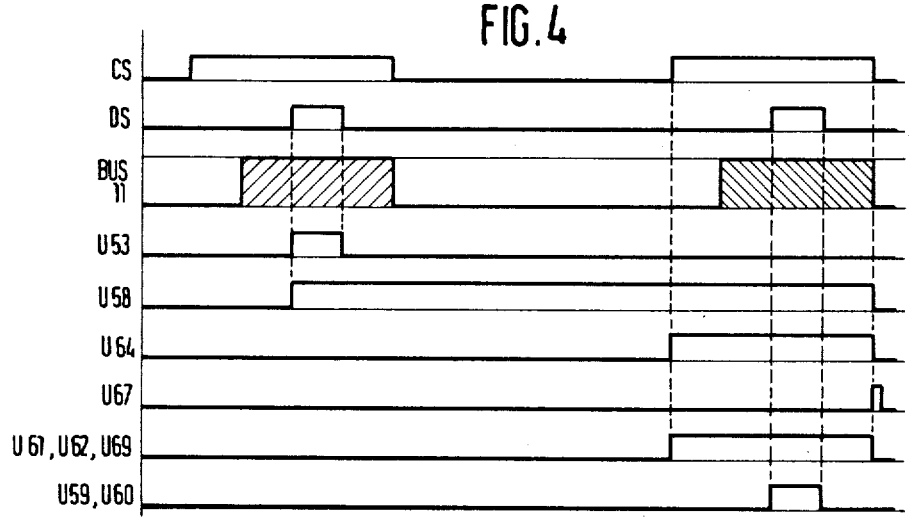
FIG. 4 is a timing diagram illustrating the operation of the circuit of FIG. 3.

The manner of operation of the embodiment illustrated in FIG. 3 will now be explained with reference to the timing diagram given in FIG. 4. For an input-output unit 12 three kinds of commands are possible. Simple switchover commands, e.g. a setting or a resetting of a flipflop or of a counter (particularly in/order to begin or end a parameter-dependent counting operation), write commands for writing a data word from the computer unit 10 into a register of the input-output unit 12 and read commands for reading such a data word out of a register of the input-output unit into a memory (not shown) of the computer 10. Whereas the first type of command is a one-byte command, the other two are two-byte commands, as will be further described below. It is thus possible to provide 256 different commands with an 8-bit data bus 11.

The computer unit provides, along with the data, for control purposes, a CS signal for activation of the selected circuit that is to respond, this signal having a duration of about 500 ns. During the presence of this chip-select signal CS an additional signal, the data strobe DS of a length of about 150 ns, is also provided by which the actual command is produced. In the decoding and synchronizing circuit 53 the data word present on the data bus at any time is continuously decoded and supplied, in accordance with the decoding, as a command to one of the AND gates 47-57. Only when CS and DS are simultaneously present does the corresponding AND gate 47-52 become conducting. There are now three possibilities to distinguish, as discussed below.

1. ONE-BYTE SWITCHING COMMAND

The output signal of corresponding AND gate 47, 48 is directly supplied to the component of the input-output circuit 12 which is to be controlled is not necessary to describe this operation any further.

2. TWO-BYTE WRITE COMMANDS

One of the flipflops 54 or 55 is set by an output signal of one of the gates 49 or 50. On the one hand a 1 signal is thereby applied to the D input of the flipflop 64 and on the other hand the interrupt command for the computer unit 10 is inhibited so long as this signal remains. Such a blocking of an interrupt command is likewise provided pending the duration of the CS signal. This condition is maintained until a further moment at which again simultaneous CS and DS signals appear. During the leading edge of the CS signal the flipflop 64 is set as a result of the 1 signal applied to the D input. Thus on the one hand, the inverter 68 and the AND gates 47-52 any possible further decoder signals are blocked and the AND gates 59-60 (naturally also the AND gates 61 and 62) are so prepared that upon the appearance of the DS signal the particular AND gate 59, 60 is connected with the set flipflop 54 or 55 becomes conducting. During the output signal of the AND gate 59 or 60 (U 59 or U 60 on FIG. 4) the designated register in the input-output circuit 12 is activated which then accepts the data word present on the data bus 11. With the trailing edge of the second CS signal the flipflop 67 is set as a result of the signal U 64 present at the D input. The flipflops 54-57 as well as the flipflop 64 are reset by the signal U 67 appearing on the output side, this being done through the OR gates 73. As the result of this resetting the flipflop 67 is likewise reset through the NOR gate 66. The initial condition of the circuit is now restored.

If after the first byte cycle a DS signal appears without a CS signal being present simultaneously, no result is obtained, since the AND gates 59, 60 are blocked as the result of the absence of the signal U 64 at the output of the flipflop 64.

3. TWO-BYTE READ COMMANDS

The events that take place in this case correspond to those in the case of write commands. The operating components are now the flipflops 56 or 57 and the AND gates 61,62. By one of the output signals of the AND gates 61,62 (U 61, U 62) the designated register in the input-output unit 12 is activated which then gives out a word to the data bus 11 while the decoder 40 is blocked. Reading rather than writing is enabled by the corresponding signal U 69 at the output of the AND gate 69, by which the switchover circuit 29 in the input-output unit 12 is switched over for reading in. The signal duration shown in FIG. 4 as U 61 or U 62 is longer than the signal duration U 59 or U 60 respectively, since there is no longer a connection with the DS signal. For the beginning of a program cycle the flipflops 54-57 as well as the flipflop 64 can also be reset by a power-on-reset circuit over the conductor 21, in order to provide a defined initial condition.

It should be understood that various functions, for example the possibiliy of providing interrupt signals can be realized by programming (software) in a manner known from the references identified in the introduction.

Although the invention has been described with reference to the particular illustrative embodiment, it should be understood that variations and modifications are possible within the inventive concept.

We claim:

1. A simplified computer system having a computer unit of the so-called microcomputer type and an input-output unit, connected to said computer unit over a data bus, for transferring externally determined values to said computer unit, said input-output unit having a register-and-counter portion comprising a plurality of registers and a plurality of counters, said system further comprising the improvement which consists in that, in order to avoid the use of a separate multiple-connection address bus between said computer unit and said input-output unit:

only a single multibit bus serving as said data bus, and not substantially more than four one-way signal connections, of which two are respectively for chip-select (CS) and data strobe (DS) functions, are provided to interconnect said computer unit and said input-output unit, and for contribution to the addressing of said register-and-counter portion of said input-output unit, the latter unit has a control circuit (13) connected to a port of said data bus and also connected to said computer unit by said not more than four signal connections;

said control circuit (13) includes a decoder (40) having an input connected to said data bus port, for providing a variety of control commands and directing said commands from said data bus respectively to various registers and counters of said register-and-counter -portion by way of different outputs (41-46) of said decoder which are connected to said register-and-counter portion (76) of said input-output unit.

2. A computer as defined in claim 1 in which said variety of control commands are of just three kinds: single-byte switching commands, plural-byte read commands and plural-byte write commands.

3. A computer system as defined in claim 1, in which said computer unit has a timing portion for supplying periodic data strobe signals having its output connected to said control circuit (13) of said input-output unit by said data strobe function connection (DS), a gate circuit array (47-52) being provided in said input-output unit at the output of said decoder (40) for permitting a control command to be given out only following reception of a data strobe signal from said computer unit coincident with the presence of a signal received from said computer over said chip-select function connection.

4. A computer system as defined in claim 3 in which said computer unit has means for producing chip-select signals and furnishing them to said input-output unit through said chip-select function connection (CS) of said computer, said gate circuit array (47-52) having groups of command connections (26,27,28) to said various registers and counters of said input-output unit and being connected for additional control by signals received over said chip-select connection (CS) from said computer unit for output selection among said groups of command connections (26,27,28).

5. A computer system as defined in claim 3 in which buffer storage means (57-57) are provided for supplying plural-byte commands, said buffer storage means having their inputts connected to those outputs of said gate circuit array which serve to transmit plural-byte commands from said decoder.

6. A computer system as defined in claim 4 in which buffer storage means (54-57) are provided for supplying plural byte commands, said buffer storage means having their inputs connected to those outputs of said gate circuit array which serve to transmit plural-byte commands from said decoder.

7. A computer system as defined in claim 5 or claim 6 in which said variety of control commands are of just three kinds, namely single-byte switching commands, plural-byte read commands and plural-byte write commands, and in which two of said not more than four connections between said computer unit and said control unit (13) of said input-output unit are respectively a clear function connection (CL) and an "interrupt" function connection (INT), sequencing circuits (74) being provided in said control circuit (13) for sequencing plural-byte commands and providing lockout protection therefor, said sequencing circuits having an input for "clear" commands connected to said clear function connection (CL) of said computer unit and having a program interrupt output connected to said interrupt function connection (INT) of said computer unit.

8. A computer system as defined in claim 7 in which said sequencing circuits (74) are so connected as to cause the first byte of a decoded plural-byte command to be stored in said buffer storage means, and in which, further, a second gate circuit array (59-62) is provided for transferring the contents of said buffer storage means to a corresponding output under control of said sequencing circuits (74).

9. A computer system as defined in claim 8 in which a second gate circuit array (59-62) is provided for transferring the contents of said buffer storage means to a corresponding output under control of said sequencing circuits (74) said sequencing circuits further containing a clearing circuit responsive to a "clear" command at their said input for clear commands, for clearing said buffer storage means after transfer of a plural-byte command.

10. A computer system as defined in claim 9 in which said sequencing circuits contain an additional gate circuit (65) for preventing the delivery of a program interrupt signal to said computer unit when a chip-select signal is present and/or when a decoded plural-byte command is being transferred by sad second gate circuit array (59-62).

11. A computer system as defined in claim 10 in which said sequencing circuits include logic circuit means (69,70) for distinguishing switching and commands from write commands and in/response thereto reversing the direction of transmission of said data bus (11) according to whether or not a write command is present.

* * * * *

UNITED STATES PATENT AND TRADEMARK OFFICE
CERTIFICATE OF CORRECTION

PATENT NO. : 4,433,379

DATED : February 21, 1984

INVENTOR(S) : Manfred SCHENK et al

It is certified that error appears in the above-identified patent and that said Letters Patent is hereby corrected as shown below:

Claim 11, col. 8, 1 25 - "switching and com-" should read
-- switching and read com- --.

Signed and Sealed this

Twenty-fifth Day of March 1986

[SEAL]

Attest:

DONALD J. QUIGG

Attesting Officer

Commissioner of Patents and Trademarks